United States Patent
Chou et al.

(10) Patent No.: US 6,680,082 B2
(45) Date of Patent: Jan. 20, 2004

(54) MIXED-METAL-NEUTRALIZED-COPOLYMER-RESINS FOR METAL COATING POWDER APPLICATIONS

(75) Inventors: Richard Tien-Hua Chou, Hockessin, DE (US); Mark Bernard Kelly, Beaumont, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/263,908

(22) Filed: Oct. 3, 2002

(65) Prior Publication Data

US 2003/0065103 A1 Apr. 3, 2003

Related U.S. Application Data

(62) Division of application No. 09/354,502, filed on Jul. 16, 1999.
(60) Provisional application No. 60/094,236, filed on Jul. 27, 1998.

(51) Int. Cl.$^7$ ............................ B05D 7/14; C09D 123/26
(52) U.S. Cl. ..................... 427/220; 428/461; 525/196; 525/221; 525/363; 525/367; 525/368; 525/369; 525/371; 525/919; 525/934
(58) Field of Search .................. 427/220; 428/461; 525/196, 221, 363, 367–369, 371, 919, 934

(56) References Cited

U.S. PATENT DOCUMENTS

| | | | |
|---|---|---|---|
| 3,264,272 A | 8/1966 | Rees | 260/78.5 |
| 3,404,134 A | 10/1968 | Rees | 260/78.5 |
| 3,526,680 A | 9/1970 | Cherdron | 260/897 |
| 3,780,140 A | 12/1973 | Hammer | 260/884 |
| 3,819,768 A * | 6/1974 | Molitor | 525/221 |
| 3,909,487 A | 9/1975 | Waggoner | 260/42.15 |
| 3,959,539 A * | 5/1976 | Waggoner | 525/330.2 |
| 3,976,723 A | 8/1976 | Williams et al. | 260/885 |
| 4,056,653 A | 11/1977 | Gebhard, Jr. et al. | 428/402 |
| 4,243,784 A | 1/1981 | Akima et al. | 526/88 |
| 4,252,924 A | 2/1981 | Chatterjee | 526/65 |
| 4,351,931 A | 9/1982 | Armitage | 526/227 |
| 4,381,376 A | 4/1983 | Albee, Jr. et al. | 525/366 |
| 4,412,040 A | 10/1983 | Albee, Jr. et al. | 525/143 |
| 4,440,908 A | 4/1984 | McClain | 525/196 |
| 4,481,239 A | 11/1984 | Eckner | 428/36 |
| 4,731,396 A | 3/1988 | Auerbach et al. | 523/439 |
| 4,770,939 A | 9/1988 | Sietsess et al. | 428/402 |
| 4,884,814 A * | 12/1989 | Sullivan | 525/330.2 |
| 4,911,451 A | 3/1990 | Sullivan et al. | 273/235 R |
| 4,990,574 A | 2/1991 | Yamada | 525/371 |
| 5,036,134 A | 7/1991 | Kunz et al. | 524/560 |
| 5,068,151 A * | 11/1991 | Nakamura | 525/330.2 |
| 5,120,791 A * | 6/1992 | Sullivan | 525/330.2 |
| 5,200,468 A | 4/1993 | Pickton | 525/183 |
| 5,298,571 A * | 3/1994 | Statz et al. | 525/330.2 |
| 5,320,905 A | 6/1994 | Vaughn et al. | 428/401 |
| 5,344,883 A | 9/1994 | Loar et al. | 525/170 |
| 5,376,446 A | 12/1994 | Huang | 428/344 |
| 5,504,167 A | 4/1996 | Vidal | 526/74 |
| 5,562,989 A | 10/1996 | Statz | 428/402 |
| 5,567,772 A * | 10/1996 | Hagman et al. | 525/330.2 |
| 5,585,431 A | 12/1996 | Igarashi et al. | 524/425 |
| 5,638,871 A | 6/1997 | Iorio et al. | 138/146 |
| 5,643,997 A | 7/1997 | Matsuoka et al. | 525/71 |
| 5,646,213 A | 7/1997 | Guo | 524/562 |
| 5,700,890 A | 12/1997 | Chou | 526/272 |
| 5,929,174 A * | 7/1999 | Permentier et al. | 525/330.2 |

FOREIGN PATENT DOCUMENTS

| | | |
|---|---|---|
| EP | 0315010 | 5/1989 |
| EP | 0443706 | 8/1991 |
| EP | 0536791 | 4/1993 |
| EP | 0798053 | 10/1997 |
| GB | 2097803 | 11/1982 |
| JP | 07171871 | 7/1995 |
| WO | WO 93/04118 | 3/1993 |
| WO | WO 93/15158 | 8/1993 |
| WO | WO 94/01469 | 1/1994 |
| WO | WO 96/06133 | 2/1996 |

OTHER PUBLICATIONS

Lewis, "Hawley's Condensed Chemical Dictionary", 12th ed., Van Nostrand Reinhold Co., NY, p. 1164 (1993).*
Alger, "Polymer Science Dictionary", $2^{nd}$ ed., Chapman & Hall, New York, p. 350 (1997).*
John W. Nicholson, The Chemistry of Polymers, *the Royal Society of Chemistry, Thomas Graham House, Cambridge England*, pp. 147–149 (1991).
International Search Report, dated Nov. 5, 1999.

* cited by examiner

*Primary Examiner*—D. R. Wilson
(74) *Attorney, Agent, or Firm*—Kevin S. Dobson

(57) ABSTRACT

The present invention relates to neutralized copolymer resins having at least two different metals with one of the metals being zinc. These mixed metal resins are transformed into particulate or powder form for application to metal objects. The powder composition has a good balance of properties including all the advantages associated with neutralized ethylene acid copolymers while also having good powder coating behavior for coatings applied to metal objects. The invention also relates to coated metal objects containing the powder composition and metal.

8 Claims, No Drawings

MIXED-METAL-NEUTRALIZED-COPOLYMER-RESINS FOR METAL COATING POWDER APPLICATIONS

This application is a divisional of U.S. application Ser. No. 09/354,502, filed Jul. 16, 1999, which claims the benefit of Provisional application Ser. No. 60/094,236, filed Jul. 27, 1998.

BACKGROUND OF THE INVENTION

1. Field of the Invention

The present invention relates to mixed-metal neutralized alpha-olefin/carboxylic acid copolymer powder coating materials for coating and protecting metal objects.

2. Description of Related Art

Thermoset powder coatings for materials or objects of metal are known. The success of powder coating in coatings of metals is mainly due to their functional and/or decorative performance as well as the reduction or elimination of noxious by-products in the production of coated substrates. Powder coatings are utilized for either decorative purposes or protective purposes. For the former, color, gloss, and appearance may be the primary attributes. Most decorative coatings are thin coatings mainly using thermoset coatings. For protective purposes, the coatings should have longevity, corrosion protection, impact resistance properties and serve as insulation. In this latter role, the coatings should be thick and can be applied in powder form.

The bulk of powder coatings are thermoset coatings. These coatings typically chemically react during baking to form a polymer network that will generally not remelt. Materials utilized in thermoset powder coatings include epoxies, polyesters and acrylics. Crosslinking agents typically employed include amines, anhydrides and isocyanates.

Thermoplastic resins, on the other hand, are generally of high molecular weight and require relatively high temperatures to achieve melt and flow during coating. However, the molecular weight and melt viscosity remain constant during the coating procedure so that the polymer can be easily remelted for easy repair or touch-up. Typical thermoplastic coating polymers include polyamides, polyolefins, plasticized PVC, polyester and poly (vinylidene fluoride), and ionomers.

U.S. Pat. No. 4,056,653 disclosed a process to make spherical ionomer particles having an average diameter of 10 to 100 microns. U.S. Pat. No. 5,344,883 discloses a polymer powder coating composition which comprises a low molecular weight ionomer to be added to polymer resin powder coating to reduce gloss. JP017145271-A discloses a composition for powder coating having an average particle size of up to 300 microns, comprising an ethylene/unsaturated carboxylic acid copolymer containing 5–15 wt. % unsaturated carboxylic acid or its salt with 0.3–5.0 wt. % of a phthalate type plasticizer compound. EP O 798 053 A1 discloses a process for forming a coating of a thermoplastic polymer powder on a hollow object formed of a low electrically conductive material. While some of the above patents disclose powder coating compositions with an ionomer and additional excipients, none disclose a mixed metal ionomeric powder coating composition for coating metal substrates.

U.S. Pat. No. 5,320,905 teaches certain ethylene carboxylic acid resins prepared from a copolymer having about 85 to about 50 weight percent olefin such as ethylene and about 15 to about 50 weight percent of at least one alpha, beta-ethylenically unsaturated carboxylic acid and at least one cationic metal compound or complex to form a salt which is ultimately made into fine particles or powders.

U.S. Pat. No. 4,440,908 teaches the preparation of certain powders of thermoplastic resins made from polyethylene or ethylene vinyl acetate copolymer. U.S. Pat. No. 4,481,239 teaches a process for coating metallic substrates with heat hardenable synthetic resins. Neutralized ethylene acid copolymers are additionally disclosed in, for example, U.S. Pat. No. 3,264,272 wherein it describes that these copolymers may be neutralized with one or more metal ions.

High molecular weight ionomer blends having different metals including sodium/zinc combinations are described in U.S. Pat. No. 4,911,451 or WO 94/01469 or EP 0 443 706 A2. However, the properties required for golf ball applications do not necessarily relate to those properties required for the functional or aesthetic application of material to metal surfaces.

Historically, many thermoplastic resins have been evaluated in powder coating applications, but few have the proper combination of physical and mechanical properties, stability, and melt viscosity. For attaining functional performance and longevity, an ideal thermoplastic polymer should have low density, high mechanical strength and good surface hardness (independent of humidity), high impact strength, scratch resistance and abrasion resistance, low water adsorption, good adhesion to metals, good resistance to chemicals in general, and weatherability.

There has been some difficulty, before the present invention, achieving both functional performance and application performance in a metal powder coating. While neutralization of ethylene acid copolymers may provide some benefits in terms of physical properties, it can actually negatively impact their use as powder coatings. For example, high hardness and stiffness and excellent scratch and abrasion resistance are "desirable" properties associated with salts of ethylene acid copolymers (neutralized copolymers) but these compounds also have reduced adhesion, high viscosity, vulnerability to weathering and water adsorption and are more prone to react with additives such as pigments.

There remains a need, therefore, for a thermoplastic polymer powder coating composition, which functions well as a metal coating and/or metal primer coating and is easy to produce and apply to the metal as corrosion protection, while also having an appropriate balance of properties. A powder coating with all the physical advantages associated with a neutralized ethylene acid copolymer is needed that also provides suitable adhesion to metals, good weatherability etc.

It has now been found that it is possible to obtain adhesive, protective and appearance qualities in a powder composition based on a thermoplastic polymer containing an ethylene acid mixed metal salt resin.

BRIEF SUMMARY OF THE INVENTION

The present invention comprises a process for preparing a powder coating material for protecting metal objects, comprising a neutralized ethylene acid copolymer resin having high adhesion to metal, high stiffness, hardness and toughness, low melt viscosity and high processability.

The present inventors have found, heretofore, it has been difficult to obtain a neutralized ethylene acid copolymer resin with a balanced set of properties which takes advantage of known characteristics of neutralized ethylene acid copolymers such as high toughness, abrasion resistance, chemical resistance, high hardness and high stiffness but which also have adequate adhesion to metal, high melt flow, weathering capability and low water adsorption properties and non-interaction with additives. High acid content and high neutralization ethylene acid copolymers are known to have excellent hardness and stiffness properties but they are also known to have poor adhesion qualities, low melt flow, water absorption properties and poor weathering properties. The inventors have discovered a combination of neutralized ethylene acid copolymers that have all the advantages generally associated with high molecular weight forms of these copolymers while also having properties which are suitable for metal coating applications.

The present invention, in particular, comprises a new physical form, a powder of a neutralized ethylene acid copolymer of mixed metal cations which provides a combination of properties for metal coating applications including strong adhesion to metal, high stiffness, hardness and toughness, low melt viscosity and ease of manufacture. The preferred metals are selected from sodium, zinc and lithium and the preferred mixed metals for neutralization are selected from Zn/Na, Zn/Mg, Zn/Ca and Zn/Li.

There is further provided according to the present invention, a coated metal substrate comprising a metal layer where the metal may be iron, steel or aluminum or other known metals or alloys, a primer coating of the metal-coating composition described above, and an optional outer coating, over the primer, of polyethylene or polypropylene or an ethylene acrylic acid or methacrylic acid ionomer. Additionally, the present invention relates to a process for coating metal objects, comprising contacting a surface of the metal object with the powder coating composition described above to form a coated metal object.

DETAILED DESCRIPTION

The invention is a high-solids or powder coating. High-solids coatings of the present invention comprise neutralized ethylene acid copolymers containing mixed metals which are further manipulated into powder form or particles and optionally blended with other suitable powder application excipients to form a powder composition. The mixed metal powder or powder composition can be applied to a metal object to "coat" at least one metal layer or metallic surface area.

The thermoplastic polymer of this invention is an ethylene copolymer obtained by copolymerization of ethylene and an acrylic acid (AA) or methacrylic acid (MAA) comonomer, and optionally a third comonomer, wherein the copolymer is neutralized with a mixed metal solution to form or ultimately form a mixed metal ethylene copolymer. This material may be used as a coating alone, i.e., a sole coating, especially with a filler, but, since it adheres well to both metal and other ethylene polymers or copolymers, it can also serve as a primer coating on metal. An outer coating of ethylene polymer or copolymer may be used over the primer coating. Preferably, it will be used as an outer coating directly applied to the metal object. In addition, the coating composition of the invention may serve as an intermediate coating layer on a metal object if the metal is previously coated with a primer coating selected from the same coating composition or a different coating composition including coatings of metal oxides or sulfates.

The individual comonomer components are generally selected from alpha-olefins having from 1 to 8 carbon atoms and a second essential component of the copolymer being selected from an alpha, beta-ethylenically unsaturated carboxylic acid having 3 to 8 carbon atoms. The acid comonomer can be present in an amount of from 12–25 wt % of the copolymer. Preferably, the copolymers comprise 78–86 wt % ethylene and 14–22 wt % MAA or AA comonomer. Other suitable comonomers and/or optional third comonomer components of the copolymer may additionally be selected from those additional monomers described in the U.S. Pat. No. 3,264,272 hereby incorporated by reference.

As indicated above, an optional third comonomer may also be present. This third comonomer can serve to reduce crystallinity compared with polyethylene homopolymer without the need to increase the level of the relatively expensive acidic co-monomer. It can also serve to increase low temperature toughness of the copolymer if the glass transition of its homopolymer is low. Suitable third comonomers include vinyl acetate and alkyl acrylates, alkyl methacrylates and alkyl vinyl ethers. They may be present up to a level of about 30 wt % based on the weight of the total monomers in the copolymer. Above this level, they are difficult to incorporate in the copolymerization. An intermediate level of from 5–15 wt. % is preferred. The preferred third comonomer is an alkyl acrylate or methacrylate because this monomer forms a homopolymer having a low glass transition temperature.

A conventional neutralized acid copolymer is a thermoplastic polymer that is ionically crosslinked. This technology entails the reaction of copolymers to form bonds between the acid groups within a chain and between neighboring chains. These polymers generally consist of an organic backbone bearing a small proportion of ionizable functional groups. The organic backbones are typically hydrocarbon or fluorocarbon polymers and the ionizable functional groups are generally carboxylic or sulfonic acid groups. These functional groups may be neutralized, for example with sodium or zinc ions. In this invention, the inventors have surprisingly found that neutralization with at least two different metals provides unexpected advantages for bonding to metal surfaces when compared to single metal neutralized copolymers.

A further general discussion of these neutralized resins can be found in The Chemistry of Polymers by John W. Nicholson, published by the Royal Society of Chemistry, Thomas Graham House, Cambridge England (1991), pp. 147–149.

It is to be understood that any suitable neutralized copolymer resin obtained from copolymerization of an α-olefin with an α,β-unsaturated acid may be used in the present invention, wherein the suitable resin has substantially similar physical properties and performs in a substantially similar manner to the mixed metal resins disclosed herein provided that the acid copolymers are neutralized with at least two different metals and one of the metals is zinc. These mixed metal ionomers are then applied to a metal surface in the form of a "powder" which may have a particle size or average particle size of about 20 to about 500 micrometers (mu).

Without being bound to any theory, it is believed that the presence of the mixed metal ionomer may greatly enhance the excellent bonding formed onto the metal and between any metal surfaces and any subsequent polymer or metal layer(s). In the preferred embodiment, resins having an MAA or equivalent molar AA content of 14–22 wt. % are used. It has been found that the degree of neutralization with the at least two different metals should be in the range of from about 10 wt % to about 60 wt % of the acid present in the copolymer, wherein the transition metal content is at least 35 wt % of the mixed cations. The most preferred mixed metal ionomer is selected from an ethylene MAA neutralized with a combination of Na/Zn wherein the ethylene MAA has an MAA content of 14–22 wt % and the range of neutralization is 25–35%.

The mixed metal resin is preferably selected from an ethylene acid copolymer wherein, in the precursor un-neutralized polymer, the MI ranges from 20 to 1,000 g./10 min. Neutralized mixed metal resins which may be used in the practice of the invention are those having a melt index of about 5 to 200 g./10 min.

Metal cations suitable for use in the practice of the present invention include, for example: monovalent cations such as $Na+$, $K+$, $Li+$, $Ag+$; divalent metal cations such as $Be+2$, $Mg+2$, $Ca+2$, $Sr+2$, $Ba+2$, $Cu+2$, $Sn+2$, $Fe+2$, $Co+2$, $Ni+2$ and $Zn+2$; and trivalent metal cations such as $Al+3$, $Sc+3$, $Fe+3$ and $Y+3$.

The molecular weight of these neutralized copolymers are generally lower than the range of the neutralized versions of ethylene acid copolymers or terpolymers sold under the trademark SURLYN® brand resins by E.I. DuPont de Nemours and Company of Wilmington, Del. allowing variation, of course, for the difference in molecular weights due to the mixed metals.

The resins are insoluble in water and are prepared in the form of a powder for application to metal and/or metal surfaces. The metal surface can be a metal or alloy as indicated previously or can be treated first with an anticorrosive agent such as a metal containing salt or oxide which is then coated with the powder coating composition of the invention. These resins have excellent impact toughness, flexibility, cut and abrasion resistance, low temperature performance and long term durability, especially at specific gravities of less than one.

The present invention relates to a method of protecting iron, steel or aluminum or other metals against corrosion which comprises applying directly on the metallic surface a powder form of a blend of, (i) 18–100 wt. % of an ethylene copolymer comprising;
  (a) 78–86 wt. % of ethylene,
  (b) 14–22 wt. % of methacrylic acid or acrylic acid wherein the acid group is neutralized with a metal selected from zinc and at least one additional metal wherein the resultant mixed metal ionomer is further manipulated into a powder; and
  (c) 0–30 wt. % of a comonomer selected from the group consisting of vinyl acetate, C3–C11 alkyl acrylate or methacrylate, and C3–C11 alkyl vinyl ether and
(ii) 0–82 wt. % of an excipient.

The mixed metal polymer is selected from a compound of the formula PZnM2 or PZn+PM2 or a mixture thereof wherein P is a polymer selected from group (i) above, and M2 is a metal selected from Groups 1–13 of the Periodic Table of the Elements. It is understood herein that, as described above, a single polymeric chain may have mixed metals which neutralized or partially neutralize the carboxylic acid moieties on that chain to form PZnM2. Or, the individual backbone chains may have a single metal which neutralizes or partially neutralizes the carboxylic acid moieties on that chain to form, for example, PZn or PM2, which are then combined to form (or formed "in situ") PZn+PM2. It is also possible to generate "in situ" or combine mixtures of PZnM2 and PZn+PM2 to form PZnM2+(PZn+PM2).

The mixed metal neutralization procedure is generally accomplished as follows. The ionomers are prepared by standard neutralization techniques such as those described in U.S. Pat. No. 3,264,272. Acid copolymer can be premixed with one or more solid sources of cation for neutralization and then processed through an extruder where melting and mixing occurs. Once mixing is completed, either water or dilute cation solution is injected into the extruder to complete the neutralization reaction. Water or solvent is then removed from the melt in one or more vacuum ports. The final product may be obtained by any one of the following production routes:

(1) introduction of both cation sources via solids blending prior to extrusion;

(2) production of two or more individual ionomers via the above-mentioned process, followed by blending and reextrusion;

(3) introduction of one cation source via solids blending prior to extrusion followed by addition of a dilute solution containing a source of second cation during the extrusion process;

(4) introduction of an ionomer containing the appropriate amount of one of the desired cations into the extrusion process after blending with a source of second cation; or (5) introduction of an ionomer containing the appropriate amount of one of the desired cations into the extrusion process followed by mixing and reaction with a liquid source of a second cation.

U.S. Pat. No. 3,264,272 to Rees, dated Aug. 2, 1966, claims a composition comprising a random copolymer of an alpha-olefin having from two to ten carbon atoms, an alpha, beta-ethylenically-unsaturated carboxylic acid having from three to eight carbon atoms in which 10 to 90 percent of the acid is neutralized with metal ions, and an optional third mono-ethylenically unsaturated comonomer such as methyl methacrylate or ethyl acrylate. This copolymer is acidic due to the carboxylic acid groups present in the copolymer.

U.S. Pat. No. 3,404,134 discloses the process for making these compositions, which comprises reacting an ethylene acrylic acid copolymer with a metal compound at a pressure between 100 and 10,000 psi and a temperature above the melt-point of the copolymer. This patent is incorporated by reference for its teaching of the ethylene acid copolymer(s) and neutralization procedures to form neutralized resins-in this instance, as stated above, the present invention may utilize the same polymeric chains disclosed therein provided that at least two different metals are used in the neutralization processes and provided that one of the metals is selected from zinc (Zn). The ethylene copolymers utilized herein may be prepared using well known methods of high-pressure, free-radical, ethylene co-polymerization using a continuously stirred reactor, operating under steady-state conditions. Such a process is described in U.S. Pat. No. 3,780,140.

Typical operating temperatures for ethylene co-polymerization range from 160 to 250° C. It can be advantageous in some applications requiring higher use temperatures to carry out the co-polymerization at the lower temperature range, for example 160 to 200° C., to obtain a copolymer having a higher temperature profile. Such an effect is described in U.S. Pat. No. 4,244,900, wherein acid polymers and ionomers having increased stiffness and higher Vicat softening temperatures are obtained at lower process temperatures.

The preferred class of polymers are copolymers of alpha-olefins containing, for example, 2 to 10, preferably 2 to 6 carbon atoms with from about 0.2 to 50, preferably about 3 to 30 mol % of an alpha, beta-ethylenically unsaturated carboxylic acid, in which about 15–60% of the carboxyl groups are neutralized with cations having a valence of 1 to 3. Preferably the neutralizing cations are metals from Groups IA, IIA, IIIA, and the transition elements of the Periodic Table (Groups 1–13 according to the Periodic Table found in the *CRC Handbook of Chemistry and Physics*, 71$^{st}$ Edition). For example, transition elements such as zinc, alkaline earth metals such as calcium and magnesium, and alkali metals such as sodium and potassium are preferred provided that the copolymer or copolymer blend contains at least two different metals and one of them is selected from zinc.

The pre-neutralized copolymer suitably may have a melt index of about 20 to 1000 g/10 min as determined by ASTM-D-1238. Suitable alpha-olefins which may be used in the preparation of the contemplated ionomers are ethylene, propylene, butene-1, pentene-1, hexene-1, heptene-1,3-methylbutene-1, and 4-methylbutene-1. The preferred alpha-olefin is ethylene.

The alpha, beta-ethylenically unsaturated carboxylic acids which can be copolymerized with the alpha-olefin preferably have 3 to 8 carbon atoms. Examples of such acids include acrylic acid, methacrylic acid, maleic acid, fumaric acid monoesters of dicarboxylic acids, such as methyl hydrogen maleate, methyl hydrogen fumarate, and ethyl hydrogen fumarate, and maleic anhydride, which is considered to be an acid in the present invention.

Although the olefin content of the ionic copolymer should be at least 50 mol percent, more than one olefin can be employed to provide the hydrocarbon segments of the copolymer. Moreover, more than one alpha, beta-ethylenically unsaturated carboxylic acid may also be employed. Additionally, any third copolymerizable monomer can be employed in combination with the olefin and the carboxylic acid comonomer. Preferred termonomers are vinyl esters and acrylates, e.g., vinyl alkanoates and alkyl acrylates and methacrylates having up to eight carbon atoms, such as vinyl acetate, vinyl propionate, methyl methacrylate, ethyl acrylate and isobutyl acrylate.

Preparation of the copolymers may be accomplished using a number of different procedures, such as by exposing a solution or finely divided powder of the major comonomer, for example, polyethylene, to ionizing radiation in the presence of the acid comonomer. In another method, the polymer of the major comonomer in solution or finely divided form is contacted with a solution of the acid and a peroxide. The copolymers may also be obtained by copolymerizing ethylene with a derivative of the acid, such as an ester, which is reacted to form the corresponding acid. All of these are standard techniques available in the scientific literature to those skilled in the art. Copolymers utilized herein may also be prepared according to the teachings of U.S. Pat. No. 4,351,931 hereby incorporated by reference.

The copolymers are thereafter reacted with metal-containing compounds in a procedure referred to herein as "neutralization", resulting in the ionic cross-linking of the copolymers. Such metal-containing compounds include ionizable metal compounds which provide metal ions having a valence state of one or more. The alkali metals are preferred, with special mention being made herein of sodium and lithium. Alkaline earth metals such as calcium or magnesium and transition metals such as zinc are also utilized.

Once the mixed metal ionomers are prepared as described above, they are further made into powder for application to metal surfaces either as a single component or in a composition containing additional coating excipients. The preparation of the powder is accomplished by grinding the dried mixed metal ionomer resins. This "grinding" creates a new physical form which is surprisingly suitable for use as a powder coating for metal or metal containing objects in the recited composition ranges. Cryogenically grinding using liquid nitrogen as a cooling medium is the preferred manufacturing process for the powder. Physically grinding the resin creates irregularly shaped particles of size and shape suitable for achieving constant flow through the application equipment. For obtaining such a suitable size, the grinding step is associated with a sieving step for eliminating the large particles and the fine size particles. The particle size is in the range of 20–500 micrometer (mu). For fluid bed coating processes, the preferred particle size is 75–350 mu. For electrostatic spraying applications, the preferred particle size is about 20 to 120 mu.

The process of the present invention preferably does not include a step of contacting a copolymer of the present invention with ammonia, or intentional formation of spherical particles comprising ammonium salts. The formation of spherical ammonium copolymer salts does nothing to enhance the process of the present invention since the copolymers are cryogenically ground, thereby forming irregularly shaped particles. Hence it is considered counterproductive in the practice of the present invention to intentionally form spherical particles only to grind them into irregular shapes.

Additional excipients are active coating ingredients which may be added to the mixed metal ionomer are selected from those additional excipients described previously. For example, the powder composition may contain stabilizers, pigments, flow additives, lubrication and/or abrasion resistance additives and fillers. The relative percentages of these excipients may be varied by a person of ordinary skill in the art depending upon the particular use of the object to be coated. The additives can be added to the powder polymer in typical melt compounding equipment prior to the size reduction step. Pigments and flow additives can be added to the ionomer powder by dry blending and/or during melt compounding. Other additives may be added to the ionomer during the neutralization step.

Suitable stabilizers are antioxidants, such as the Irganox family produced by Ciba-Geigy, and UV stabilizers such as Cyasorb light stabilizer and light absorber produced by Cytec. The preferred antioxidants are based on hindered phenols, and the preferred UV stabilizers are based on hindered amine light stabilizers (HALS). Suitable pigments include both inorganic and organic pigment that provides desirable color, such as titanium dioxide for providing white color.

Suitable fillers include mineral fillers such as inorganic oxides, carbonates, sulfates or silicates of a metal of Groups IA, IIA, IIIA, IIB, VIB or VIII of the periodic table of the elements. The preferred fillers are calcium carbonate, barium sulfate and magnesium silicate. Suitable flow additives or flow control agents include acrylate copolymers, fluorocarbons and silicones. One of the preferred modifiers is micronized fluorocarbon, such as tetrafluoroethylene polymers, for providing lubricity and abrasion resistance.

Particulate fillers, particularly those laminar in shape, are commonly used in coatings to improve corrosion resistance. They aid in reducing differential coefficient of expansion and may reduce permeability by increasing tortuosity of the path that would be required for a fluid to permeate the coating. Particulate zinc as a filler is particularly advantageous because it has yet another corrosion protective function, which is related to its reduction potential. It is known for use in coatings and paints. Use of zinc itself as a protective coating is known and conventional, particularly with steel because of its reduction or galvanizing potential.

Fillers may be present in the ethylene copolymer coatings of this invention. The shape, size, and size distribution of the filler all impact its effectiveness of a filler, though, at high levels, the particular characteristics of the filler become less important. Zinc flakes and powder appear to be highly suitable. Small particle size facilitates preparation of uniform coatings. For example the particles are preferably less than about 400 microns maximum diameter, and most preferably less than 45 microns. The copolymer composition may be mixed with the filler using well known melt mixing methods employing extruders or other suitable mixers such as a Banbury or Farrel continuous mixers or roll mills.

The amount of filler, if present, can vary widely. Above about 82% of a particulate filler, based on the weight of copolymer plus filler, properties such as flexibility, ductility, elongation and tensile strength of the filled material drop off rapidly. A small amount of filler (2% and up in some cases, 5% and up in others and 10% and up in still others) may be sufficiently advantageous for some coating environments or end uses, while in other cases high levels (up to about 82%) of a particular filler such as a reducing filler like zinc may be preferable. One skilled in the art will be able to determine if and how much filler is most suitable.

Once the powder coating or powder coating composition is prepared, it may be applied to metal surfaces or multilayer structures by known powder application means. The powder is preferably processed for fluid bed or electrostatic spraying or flame spray. Powders of this invention are highly resistant to chemical attack and permeation by liquids. They have high melt strengths and adhere well to metals and to finishes of epoxy and urethane.

This invention further relates to a multi-layer coated metal tube, and more particularly to a metal tube having an outer surface coated with a plurality of layers of plastic material securely bonded thereto. Metal pipes often have their outer surfaces covered with a protective coating. These pipes are used for conveying brake fluids, fuel and the like in a motor vehicle. As such, these pipe lines are located under the body of the vehicle. Since they are used in such a harsh environment, the pipes are required to have a high degree of corrosion resistance, scratch resistance, impact strength and mechanical wear resistance. In cold climates, it is not unusual to encounter rock salt sprinkled onto road surfaces in order to prevent freezing of water on the road surfaces and the inherent dangers caused thereby. The popularity of spreading rock salt has created a serious problem of pipe corrosion. The pipes are also vulnerable to damage or wear from stones or mud spattered by rotating wheels of the vehicle. It is, therefore, necessary that the pipes attached to the underbody of the vehicle be coated so as to resist both chemical corrosion and mechanical damage or wear.

These mixed metal copolymers are then manipulated into powder form suitable for applying to metal layers or surfaces in sufficient amount to provide a protective layer. The thickness of the layer(s) may vary depending upon the anticipated application and end use. Multiple layers of the powder may be applied to the metal surface or at least one mixed metal layer may be part of a multilayer structure selected from metal, glass, thermoplastic polymers etc. depending upon the target structure or end use.

Self adhesive thermoplastic coating powders can be processed for fluid bed or electrostatic spraying of flame spray or additional methods known in the art. The powder coating can be applied to all metal components including steel, galvanized steel, ferrous alloy, aluminum, aluminum alloy, tin, lead or other metal surfaces. The powder, as stated above, can be used in a broad range of applications which require corrosion resistance, abrasion and wear resistance, impact resistance and chip resistance. The coating provides maximum protection along with an aesthetically pleasing high gloss surface. This thermoplastic may be applied to many parts of automobiles and domestic appliances and may also be applied to any metal surface on automobile parts or other fabricated metal components or parts. The powder provides corrosion protection for metal parts on automobiles, offshore installation structures, drinking water supply pipes etc.

Examples of other fine powder which may be added to the mixed metal ionomer include organic pigments, such as azo, phthalocyan, indanthrene and dye lake pigments, inorganic pigments such as oxide pigments, e.g., titanium oxide, chromomolybdic acid, sulfide selenium compound, ferrocyanide and carbon black pigments; and powders such as aluminum oxides, aluminum hydroxides and calcium carbonate. Among them, the pigments are preferred because they can maintain a good powder flowability and color the molded article even when used in a small amount, which enables the subsequent coloring step to be omitted.

In addition to the above-mentioned fine powder, fine thermoplastic resin powder may also be used to blend with the mixed metal ionomer. Examples of such a thermoplastic resin powder are those of polypropylene resins such as homopolypropylene, propylene-ethylene random copolymer, propylene-ethylene block copolymer, propylene-butene random copolymer, propylene-ethylene-butene terpolymer, etc.; polyethylene resins such as high pressure polyethylene, low pressure polyethylene, linear low density polyethylene, ethylene-vinyl acetate copolymer, ethylene-methacrylic acid copolymer, ethylene -acrylate-maleic anhydride terpolymer, ethylene-glycidyl methacrylate copolymer, ethylene-glycidyl/methacrylate-vinyl acetate terpolymer, ethylene, glycidyl methacrylate-methacrylate terpolymer, ethylene-alpha-olefin copolymer, modified polyolefin, chlorinated polyethylene; etc.; vinyl resins such as poly(vinyl chloride), vinyl chloride-vinyl acetate copolymer chlorinated poly(vinyl chloride), vinyl chloride-ethylene-vinyl acetate copolymer, vinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, styrene-divinyl benzene copolymer, etc. These resin powders may be used alone or in any mixture thereof along with the mixed metal coating composition.

The present invention relates to thermoplastic anti-corrosion coatings, particularly primer coatings for metals wherein the coating comprises a mixed metal copolymer as discussed above. More particularly, it relates to copolymers of ethylene with a co-monomer selected from MAA or AA wherein the copolymer is neutralized with at least two different metal salts to form a mixed metal copolymer that is then put into powder form for coating onto metal, optionally with a filler such as zinc and applied as a thermoplastic coating to prevent corrosion of metals.

It is also possible to make homogeneous metal salts and blend them to form mixed metal ionomers that are subsequently manipulated to powder form or it is possible to blend powders of different metal salts of ethylene acid copolymers or terpolymers.

The metals that provide the metallic surface for applying the ethylene acid mixed metal powder include all metal or metal containing components such as steel, galvanized steel, bronze, ferrous alloy, aluminum, aluminum alloy, tin, lead, iron, copper or mixtures of these and includes metal objects or parts treated or coated with a metal containing salt such as iron sulfate or metal oxides which are generally applied as an antioxidant.

Metal vessels, pipes and other forms used for containing and transporting a variety of materials are subject to corrosion or erosion by the contained or transported materials. Metal objects are also subject to corrosion or erosion by the environment with which they come into contact. For example, soil, salt water or atmospheric and climatic conditions can have a harsh effect on metal. To protect against such corrosion and erosion, metals are commonly coated with plastic materials. In addition to providing protection against corrosion or erosion, certain plastic coatings provide desirable properties inherent in the plastic being used. For example, a very smooth surface can reduce the coefficient of friction in a pipe thus reducing the energy needed to pump a fluid through the pipe.

To provide effective protection against corrosion, a coating should have good adhesion to the metal and should be relatively impermeable to agents which could, in themselves, cause corrosion of the metal or to agents which cause a loss of adhesion of the coating to the metal. Poor initial adhesion or subsequent loss of adhesion will allow the metal itself to become directly exposed to corrosive environments. Thus, both impermeability and long term adhesion are important characteristics of a good corrosion-prevention coating.

Coating materials differ in their advantages, however. Polyolefin thermoplastic coatings such as polyethylene or polypropylene are resistant to water and chemicals, but they do not adhere well to metals. By contrast, neutralized ethylene acid copolymers, such as ion-neutralized ethylene (meth)acrylic acid copolymers, provide a high level of good adhesion to metals, are tough and provide good corrosion resistance to metals. However, the powder coating derived from known ionomers that can be applied as a powder coating are too soft to provide adequate abrasion and scratch resistance for more demanding applications. Monomers can attain superior mechanical properties by going to a high degree of neutralization. Unfortunately, this approach has adverse effects on the requirement for attaining a good powder coating such as high melt flow, good adhesion to metal and high water resistance. The present inventors have discovered that mixed metal resins in powder form have the traditional benefits of neutralized ethylene acid copolymers which are neutralized with a single metal and do not have the associated disadvantages—e.g., water sensitivity and permeability.

Adhesion and permanence of that adhesion to metals are complex phenomena. Loss of adhesiveness may be due to mechanical or chemical causes. Differential thermal expansion of the metal and the coating can cause mechanical failure of the bond between them, while many agents can attack the metal-coating bond. Since all of the qualities of a good coating (relative impermeability to potentially corrosive agents plus good and lasting adherence under a wide range of conditions) are not always possible in one coating, it is common to use primer coatings between the metal and an outer plastic coating to provide permanent adhesion between the metal and outer coating, yet maintain the advantages of the outer coating.

Thermoset epoxy primers or sole coatings are known and among the preferred materials for primers or sole coatings. Thermosets have the advantage of relatively low coefficient of expansion and less differential coefficient of expansion with metals. They are, however, quite brittle and are therefore used in quite thin layers. Moreover, they must be cured. Thermoset epoxy resins are excellent adhesives but do not necessarily provide ideal coatings for many purposes.

In coating metals with plastic coatings, it is normal to first sandblast the metal and/or clean the metal surface with solvents to help remove grease or oxide layers. In addition, washing with various silanes, such as gamma-aminopropyltriethoxysilane, may help in reducing any adverse effect of moisture at the metal/coating interface. Metal pre-treatment is preferred.

The thermoplastic powder coatings of the present invention may be applied to the metal surface by pressure laminating, vacuum laminating, extrusion coating, flame spraying or any other method suitable for thermoplastic powder coating. Thicker coatings, which generally provide better protection of the coated metal, can be applied without the problems presented by the brittleness of thermoset epoxy resins. However, coatings as thin as 5 to 10 mils (0.13 to 0.25 millimeters) have been found entirely suitable.

Test Methods

Melt Index (MI)

MI was measured using ASTM D-1238 using a 2160 gram weight measured at 190° C.

Adhesion to Metal

Press molded 10 mil films of the examples of the invention were prepared and laid on metal coupons prepared from white blasted cold roll steel (3"×6"×⅛" thick) that was preheated at 200° C. for 20 min. in an oven. The composite structure (metal layer and mixed metal ionomer film) was then heated in the oven for an additional five minutes at the same temperature. The adhesion of the film to the metal was checked after one week by testing it with a utility knife which cuts and peels off the film coating. A cross was cut into the film and the structure was immersed in water at room temperature for the one-week period and then checked for relative adhesion. A rating of 1 to 5 was given to indicate the strength of the adhesion to metal with 1 or 2 indicating relatively easy to peel, while 3 indicates "difficult, but peelable" and 4 indicates "very difficult, but peelable to a limited degree" and 5 indicates "not peelable."

Water Sorption

The press molded films of about 10 mil thick were immersed in deionized water for 4 days at room temperature and then removed from the solution to determine weight gain. The samples were also examined for any changes in appearance.

Flex Modulus

This parameter was measured by ASTM D-790 on an injection molded specimen of the example or comparative example.

Tensile Modulus

This parameter was measured using ASTM D-638 on an injection molded specimen of the example or comparative example.

Hardness (Shore D)

This parameter was measured using ASTM D-2240 on an injection molded specimen of the example or comparative example.

60 Degree Gloss

This parameter was measured using ASTM D-2457.

The following examples further exemplify the features of the invention and are to be construed in a non-limiting manner.

EXAMPLES

Table 1 lists the comparative resin examples and mixed metal compositions that, in the latter case, are precursors to the claimed mixed metal powder compositions of the invention. The information presented includes the composition and melt flow index (MFI) of the precursor acid copolymers, the cation type and the mole ratio of the mixed ion pair and degree of neutralization as well as the MFI of the neutralized resins.

In order to prepare the neutralized compositions in Table 1, the respective precursor acid copolymer was reacted with a concentrate containing either sodium carbonate (45 wt. % solution), lithium hydroxide (30 wt. % solution), magnesium hydroxide (50 wt. % solution) or zinc oxide (45 wt. % solution) or a mixture of these. The reaction was conducted in a single screw extruder facilitated by injecting a constant stream of deionized water at a rate corresponding to about 3 percent of the throughput rate of the polymer. About 1 wt. % antioxidant and 0.8 wt. % of UV stabilizers were further compounded into the polymers in a 30 mm twin screw extruder with a melt temperature set at about 230 to 250° C.

Table 2 lists the properties of the precursor resins and neutralized resins shown in Table 1. These properties are Hardness, Flex Modulus, Tensile Modulus, water sorption and relative adhesion to metal.

The sodium salt, C3, showed poor water resistance and poor adhesion to metal. The magnesium salt, C7, also showed poor adhesion to metal as did the Na/Li resin, C6. The zinc resin, C4, had excellent adhesion to metal and good mechanical strength but too high a viscosity to be suitable as a powder coating material. On the other hand, C1 and C2 had adequate melt flow for powder coating applications but did not have adequate mechanical strength or hardness for broad application and use where abrasion resistance and scratch resistance are required. C5 had adequately good melt flow and mechanical strength, but the mechanical strength was inferior to the mixed ion resin of example P3.

The results in Table 2 also surprisingly show that the zinc based mixed metal ions shown as P1–P5 (also claimed herein) have an excellent balance of properties that, when subsequently ground to a powder, could be suitable for powder coating applications if the powder retained the balance of properties and applied suitably to, for example, a metal surface. These compositions have excellent mechanical properties, good adhesion to metal and effective water resistance.

TABLE 1

| Examples[1] | Comonomer Ratio (wt %/wt %) | MI (190° C.) (acid copolymer) | Neutralization (%) | Cation (ratio) | MI (190 C.) (neutralized resin) |
| --- | --- | --- | --- | --- | --- |
| C1 | E/MAA (85/15%) | 60 | 25 | Zn | 25 |
| C2 | E/MAA (81/19%) | 300 | 25 | Zn | 30 |
| C3 | E/MAA (85/15%) | 60 | 60 | Na | 1 |
| C4 | E/MAA (85/15%) | 60 | 60 | Zn | 1 |
| C5 | E/MAA (85/15%) | 150 | 30 | Zn | 18 |
| C6 | E/MAA (81/19%) | 300 | 25 | Li/Na (50/50%) | 35 |
| C7 | E/MAA (85/15%) | 60 | 60 | Mg | 0.8 |
| P1 | E/MAA (81/19%) | 300 | 25 | Zn/Na (75/25%) | 35 |
| P2 | E/MAA (81/19%) | 300 | 30 | Zn/Na (50/50%) | 20 |
| P3 | E/MAA (85/15%) | 150 | 30 | Zn/Na (75/25%) | 16 |
| P4 | E/MAA (85/15%) | 60 | 30 | Li/Zn (35/65%) | 8 |
| P5 | E/MAA (80/20%) | 300 | 30 | Na/Zn (30/70%) | 28 |

[1]Examples C1–C7 are not examples of the present invention.

TABLE 2

| | Hardness | Flex Modulus (KPSI) | Tensile Modulus (KPSI) | Water Sorption (wt. %) | Adhesion to Metal |
| --- | --- | --- | --- | --- | --- |
| Comp. Ex. | | | | | |
| C1 | 60 | 19 | 21 | 0.15 | 5 |
| C2 | 63 | 25 | 28 | 0.12 | 4 |
| C3 | 71 | 58 | 79 | 0.03 | 4 |
| C4 | 70 | 50 | 75 | 0.53 | 1 |
| C5 | 67 | 34 | 34 | 0.2 | 5 |
| C6 | 70 | 56 | 53 | 0.18 | 2 |
| C7 | 65 | 48 | 49 | 0.2 | 2 |
| Examples | | | | | |
| P1 | 70 | 59 | 54 | 0.12 | 4 |
| P2 | 70 | 67 | 71 | 0.2 | 4 |
| P3 | 66 | 49 | 52 | 0.16 | 4 |
| P4 | 63 | 34 | 40 | 0.12 | 4 |
| P5 | 67 | 48 | 52 | 0.17 | 4 |

The Examples show high mechanical strength, high hardness, low water sorption, high melt flow and good adhesion to metal. Given the fact that most of the examples have hygroscopic sodium or lithium metal cations, it is unexpected and surprising that these resins had both excellent water resistance and adhesion to metal. More specifically, examples P1 and P2 based on a copolymer precursor having a high acid content showed the most desirable balance of properties—superior mechanical strength for abrasion and scratch resistance, high melt flow, low water sorption and good adhesion to metal. In order to retain good adhesion to metal over a long period of time, the sodium content in the mixed metal resin should be less than 50 mole % of the mixed metal species.

Powder Coating Compositions

In order to test hardness for powder compositions prepared from the examples such as P1, a Wilson Tukon hardness tester was used. This instrument is available from Wilson Instrument Company, Division of Instron Corp., 100 Royall St., Canton, Mass. The test measures the indentation hardness of coatings by applying a static indentation with a given gram weight. The indentation is made with a Knoop diamond indenter with a load of 10 grams. A microscope is used to measure the diagonal of the indentation. These measurements, in micrometers, are then used in the Knoop formula in conjunction with the load to calculate a Knoop hardness number. The higher the number, the harder the coating.

The powder compositions of the invention and comparable powder compositions were prepared by cryogenically grinding P1, P2 and C1 and C2 using liquid nitrogen as the cooling medium. The particle size of the resultant powder was measured using a Microtac Full Range Analyzer (Leeds and Northrup Co.) and was generally in the range of 75 to 300 microns. The mean average size of the resultant powder particles was about 160 to 190 microns.

The powder coatings were then applied to a metal coupon in the following manner. A lab size fluidized bed container with a porous intermediate plate fitted 20.3 to 30.5 cms (8 to 12 inches) above the bottom was used as the coating environment. 1.41 kg/m2 (20 psi) of forced air was passed through the porous plate into the fluidized bed having the powder lying on top of the plate. Before powder coating, the metal coupons, white metal blasted cold roll steel 7.62 cm×15.24 cm×0.30 cm thick (3"×6"×⅛" thick), were preheated in an oven for twenty min. at 300° C. The preheated steel was then dipped into the fluidized bed for four seconds and kept in continuous motion to form powder coated metal objects. Upon air cooling, the examples demonstrated excellent coatings with high gloss.

Table 3, below, provides the 60 degree gloss and Knoop hardness index for the powder ground examples and comparative examples. The data demonstrates the surprising and significant advantages of the claimed mixed metal powder coating composition relative to, for example, the single metal resin powder coatings.

TABLE 3

| Powder Examples or Comparative Examples | Film Thickness (mil) | 60 deg. Gloss | Knoop Hardness Index | Adhesion to Metal |
| --- | --- | --- | --- | --- |
| C1 | 19.5 | 78 | 1.7 | excellent |
| C2 | 29.2 | 79 | 3 | excellent |
| 1 | 21.1 | 88 | 4.6 | excellent |
| 2 | 22 | 89 | 4.8 | excellent |

Surprisingly, as shown above, examples 1 and 2 had significantly higher gloss than the comparative powder coatings. In addition, the Knoop hardness for the examples of the invention were much higher than the comparative powder coatings. Examples 1 and 2 also surprisingly demonstrated greater scratch resistance (tested by scratching the surface with, for example, a fingernail). The adhesion of the coatings was excellent and improved with age or time. It was very difficult, even with a sharp knife with a razor profile edge, to cut open the coating of example 1 in order to grab a portion of the layer to peel it off. The coating on example 1 and 2 was also extremely tough-in a hammer test where a hammer is used to hit the coatings, there was no breakage or exposure of metal even after repeated hammering.

What is claimed is:

1. A method of coating a metallic surface comprising the steps:

(a) preparing a resin powder comprising at least one neutralized acid copolymer wherein the neutralized copolymer is a mixed metal salt of zinc (Zn) and a second metal (M2) that is different from Zn, wherein:
   (i) the acid copolymer is obtained by copolymerization of an alpha-olefin with an alpha-beta unsaturated carboxylic acid;
   (ii) the copolymer includes the alpha-olefin in a wt % range of from about 78% to about 86% and the carboxylic acid in a wt % range of from about 14% to about 22%, based on the total weight of the copolymer;
   (iii) the copolymer optionally includes a third comonomer in an amount of up to about 30 wt % based upon the total combined monomer weight in the copolymer;
   (iv) the copolymer has an MI in the range of from a about 20 to about 1,000 g/10 min;
   (v) the carboxylic acid group is neutralized with Zn and M2 to a combined neutralization level of from about 10 mol % to about 60 mol % of the acid;
   (vi) M2 is selected from Groups 1–13 of the Periodic Table of the Elements; and
   (vii) the transition metal content is at least 35%;

(b) forming a powder having irregularly shaped particles from the resin by grinding the copolymer, the particles having a particle size in the range of from about 20 to about 500 micrometers; and (c) applying the powder to the metallic surface or a layer on said surface to form a powder coating on said surface or layer.

2. The method according to claim 1 wherein the carboxylic acid is selected from methacrylic acid or acrylic acid.

3. The method of claim 2 wherein the alpha-olefin is ethylene.

4. The method according to claim 3 wherein M2 is selected from metals in Groups 1–12 of the Periodic Chart.

5. The method according to claim 4 wherein M2 is selected from metals in the group consisting of: sodium, calcium, magnesium, or lithium.

6. The method of claim 5 wherein M2 is magnesium.

7. The method of claim 6 wherein 25 to 35% of the acid is neutralized.

8. The method of claim 3 wherein the resin powder includes at least 2 wt % of a filler.

* * * * *